Patented Feb. 27, 1940

2,191,802

UNITED STATES PATENT OFFICE 2,191,802

PREPARATION OF FUSIBLE KETONE-ALDEHYDE SYNTHETIC RESINS

Emil E. Novotny and George Karl Vogelsang, Philadelphia, Pa.

No Drawing. Application December 27, 1937, Serial No. 182,010

15 Claims. (Cl. 260—42)

This invention relates to the art of preparing synthetic resins, and has particular reference to resinous complexes and compositions produced by reacting substances containing a reactive ketone group with substances containing a reactive aldehyde group.

Prior to the present invention, synthetic resins have been prepared by reacting substances containing a reactive ketone group with substances containing a reactive aldehyde group. The patent and technical literature indicates that prior workers in the art considered it absolutely essential that the reaction be carried out under distinctly alkaline conditions. To this end prior workers carefully avoided the presence of acids during the entire process, though it is to be noted that several workers in the art have suggested that the reaction may be stopped by adding sufficient acid to render the solution exactly neutral or slightly acid.

The present invention differs from the prior art in that the reaction is carried out in two separate and distinct stages. The reagents are first reacted in the presence of alkalies under controlled reaction conditions to produce a homogeneous and fusible intermediate product, and the intermediate product is further reacted under acid conditions. As will hereinafter be pointed out at considerable length, by carrying out the reaction in two separate and distinct stages as contrasted with the single stage of the prior art we have succeeded in preparing a wholly new and distinctive class of resinous complexes and compositions having unique properties in the way of chemical reactivity, compatibility and physical characteristics which render them especially suitable for a large number of useful purposes.

The products of the present invention may for the purpose of convenience be referred to as "keto-butanol resinous complexes" or "Afr resins" or simply "Afr" (abbreviation for acetone-formaldehyde resin). Depending to a large extent upon such factors as particular reagents, catalysts or condensing agents, proportions, details of procedure and other reaction conditions, the products can be prepared in a large number of varieties or modifications as regards viscosity and fusing point, the products varying from moderately viscous liquids to thick, sticky, soft solids and grindably hard materials. It is also possible to control the chemical reactivity of the products so that they vary from moderately reactive types to very reactive types of Afr. The less reactive types of Afr may for convenience be referred to as "standard Afr", and the more reactive types may be designated as "super-active Afr". As will hereinafter be pointed out, the reactivity of the product is very closely related to the relative proportions of the reagents as well as to the yield of product. Generally speaking, the yield in the case of standard Afr is much greater than in the case of super-active Afr. For this reason, the standard types of Afr may also be referred to as the "maximum yield product".

In practicing our invention, we have found it preferable for the reagent containing the reactive ketone group to be of the straight ketone type, that is of the type of $R_1$—CO—$R_2$. Furthermore, our findings indicate that it is particularly advantageous for at least one of the radicals ($R_1$ or $R_2$) to be a simple methyl group. In other words, compounds of the type of $CH_3$—CO—$R_2$ are particularly suitable for use in our process. In the case of the standard or maximum yield product, $R_2$ may be an organic radical with from one to six carbon atoms. The substitution of elements such as chlorine or bromine or of radicals such as hydroxyl or nitro groups into either $R_1$ or $R_2$ does not appear to appreciably affect the result, although the resulting product will be possessed of modified chemical and physical characteristics. In the case of the super-active product, the most suitable reagent containing the ketone group is dimethyl ketone (acetone), though we may use methyl ethyl ketone. However, it is to be noted that when methyl ethyl ketone is used the reactivity of the product is not as great as when acetone is employed. The higher homologues of the acetone series are not suitable for use in producing the super-active form, though they may be added to the reaction mixture for the purpose of modifying the product in such respects as solubility, fusibility and compatibility. As modifying agents we may also employ ketones of the alicyclic series such as cyclohexanone as well as ketonic bodies which are derivable from ketones. As examples of such substances may be mentioned mesityl oxide, diacetone alcohol, keto butyl alcohol, phorone and isophorone. The various modifying reagents above enumerated may be used in the preparation of not only the super-active product but also of the standard product. Certain of them such as methyl butyl ketone and cyclohexanone may be used in the case of the standard product instead of acetone, though they may more advantageously be used in admixture with acetone. It is to be noted in this connection that acetone is very attractive as a raw material from a commercial standpoint. Not only does it produce the most satisfactory results, but it is available in technical grades having a purity close to 100% in practically unlimited quantities at relatively low prices. It is further to be noted that ketonic substances containing more than one ketone group in the molecule can be used in our process, and that the presence of unsaturated linkages and even conjugated double bonds do not interfere with the preparation of the products of the present invention.

The reagent containing the reactive aldehyde group is preferably an aldehyde, though satisfactory results may be obtained with addition products or derivatives of aldehydes. In the case of the standard product, aliphatic aldehydes with one to six carbon atoms may be employed, formaldehyde or its derivative, paraldehyde, being preferred. In the case of the superactive product, the best results are likewise obtained with formaldehyde. Less satisfactory super-active products are obtainable with acetaldehyde, and the higher aldehydes do not appear to be particularly suitable. In the case of both types of products, good results can be obtained by using admixtures of formaldehyde with other aldehydes.

In the following description and claims, the term "ketone", unless otherwise indicated or required by the context, is intended to include substances containing a reactive ketone (—CO—) group which are suitable for use in our process. Likewise, the term "aldehyde" is intended to include substances containing a reactive aldehyde (—CHO) group which are suitable for use in our process.

The details of procedure may be varied considerably, it being essential for our purpose that the reaction between the ketone and the aldehyde be carried out in two separate and distinct stages; the first stage of the reaction being carried out under alkaline conditions and the second stage under acid conditions. However, as has already been indicated and as will hereinafter be pointed out in greater detail, the specific chemical and physical properties of the products depend in large measure upon such factors as particular reagents, catalysts or condensing agents, proportions, details of procedure and other reaction conditions.

Various alkaline catalysts or condensing agents may be used in the first stage of the reaction. It may be stated as a general rule that most substances which give a distinctly alkaline reaction when dissolved in water may be used. As examples may be mentioned the oxides, peroxides and hydroxides of the alkali metals and of the alkaline earths as well as the salts of these elements with weak acids such as carbonic, boric, stearic, palmitic, silicic and benzoic. The alcoholates or alkoxides and the alkali-substituted anilines may also be used. As additional examples of suitable alkaline catalysts may be mentioned the alkali salts of phenolic bodies such as the sodium, potassium or lithium salts of carbolic acid, of the cresols and of the xylenols as well as of the tertiary amyl phenols, of the phenyl phenols and of the phenols of diphenyl, naphthalene, anthracene, etc. The alkali metal salts of catechol, hydroquinone (quinol) and resorcinol are also suitable for use as catalysts in the first stage of the reaction. As an indication of the large number of possible alkaline catalysts, it may be stated that in the case of a single alkali metal such as potassium, we may use any of the following: potassium in metallic state, potassium oxide, potassium peroxide, potassium hydroxide, potassium carbonate, potassium bicarbonate, potassium borate, potassium stearate, potassium silicate, potassium methoxide, potassium ethoxide, any of the potassium salts of the various phenolic bodies, and the di-potassium substitution product of aniline as well as mixtures of two or more of these compounds.

There are various acid catalysts or condensing agents that are suitable for use in the second stage of the reaction. Generally speaking, the so-called strong non-oxidizing acids such as phosphoric, phosphorous, hydrochloric and sulphuric may be employed. Strong oxidizing acids such as nitric, chloric, perchloric and iodic are undesirable because they introduce a fire hazard. Organic acids such as the various sulphonic acids have been found suitable. As examples of such organic acids may be mentioned methyl hydrogen sulphate, ethyl hydrogen sulphate, phenol, sulphonic acid, phenyl sulphonic acid and naphthol sulphonic acid. Instead of employing an acid we may employ substances which in the reaction mixture react or decompose to liberate acids of sufficient strength to serve as catalysts. As examples of such substances may be mentioned halogen and oxy-phosphorous compounds such as boro-chlorides, boro-fluorides, silicon tetrachloride, silicon tetrafluoride, and phosphorus oxychloride, as well as a host of organic compounds such as dimethyl sulphate, diethyl sulphate, dipropyl sulphate, etc.

Certain of the foregoing acid catalysts are more suitable for use in our process than others. For instance, phosphoric acid can be used to better advantage than sulphuric acid, it being much easier to control the reaction when phosphoric acid is employed. Furthermore the color of the product is somewhat darker and the yield is somewhat less when sulphuric acid is used. However, all the advantages of using phosphoric acid can be secured if only a portion of the phosphoric acid is replaced by sulphuric. In actual practice, we have found it possible to replace with sulphuric acid that part of the phosphoric acid which corresponds to the formation of the di-alkali-phosphate with the alkaline materials which have been used in the first stage of the reaction. In other words, we have found it advantageous to use phosphoric acid as the acidic material in excess of what is required to neutralize the alkali catalyst used in the first stage of the reaction. In this way, we have found it possible to obtain substantially as good results by employing the less expensive mixture of sulphuric and phosphoric acids as when the more expensive phosphoric acid alone is employed.

There are certain factors which influence the course of the reaction so as to produce either the standard or the super-active type of product. As has already been indicated, in producing the standard product there is a greater leeway in the choice of reagents than in producing the super-active product. Both types can be produced by reacting acetone or methyl ethyl ketone with formaldehyde, but the higher homologues of these reagents are more suitable for the preparation of the standard product than they are for the preparation of the super-active product. The greatest effect upon the course of the reaction appears to be produced by the relative proportions of the reagents, assuming, of course, that the other conditions are such that either type of product may otherwise be produced. In the case of formaldehyde and acetone as reagents, if the proportions are between 0.2 and 1.0 mole of formaldehyde per mole of acetone, the resulting product will be of the super-active type. The optimum range for this product appears to be between 0.3 to 0.5 mole of formaldehyde per mole of acetone. If the ratio of formaldehyde to acetone is raised above 1.0 mole of formaldehyde per mole of acetone, the tendency is to produce the standard type. The optimum ratio for this product is about 2.6 moles of formaldehyde per mole of acetone. The proportions of the reagents are about the same as those given above, if methyl ethyl ketone is substituted for the acetone. As will hereinafter be pointed out, the proportions of both catalysts also have an appreciable effect on the amount of yield.

The following is given as an illustrative procedure for preparing the standard or maximum yield product:

Step one

The basic catalyst (e. g., potassium carbonate) is dissolved in approximately one-third the amount of the aldehyde (e. g., formaldehyde) that is to be used in the process, and the resulting solution is then gradually added to the entire amount of ketone (e. g., acetone) that is to be used, the mixture being constantly stirred during the mixing operation. As has been stated, the optimum ratio of ketone to aldehyde is preferably one mole of ketone to 2.6 moles of aldehyde. The alkaline catalyst may be used in the proportion of about 1% on the weight of the ketone. The reaction is exothermic and the mixture soon comes to a boil without the application of outside heat. In order to avoid undue loss of acetone by evaporation, it is necessary either to use a reflux condenser or to cool the reaction mixture. The reaction may advantageously be carried out in a vessel provided with a stirrer, reflux condenser and suitable means for regulating or controlling the temperature. When substantially all the aldehyde has reacted and the temperature has dropped somewhat, another one-third of the aldehyde is added and when the reaction has again subsided and the mixture has again cooled down, the remainder of the aldehyde is added and the reaction allowed to go to completion.

It generally requires several hours to complete the first stage. However, if the solution is allowed to cool down to room temperature after each partial reaction, it is usually necessary to allow the reaction mixture to stand over night. It has been found helpful at the end of the first stage to introduce a small amount of aqueous caustic soda or potash. This appears to have the effect of bringing the reaction to completion and perhaps results in a more advanced reaction. At any rate the yield of finished product is raised somewhat, particularly when higher ratios of aldehyde to ketone are employed.

The product of the first stage is an amber to brown colored liquid more viscous than water.

Step two

To the solution as prepared in the first step is now added a predetermined quantity of an acid catalyst such as phosphoric acid. It is desirable to add such a quantity of the phosphoric acid that will be potentially capable of reacting with the potassium present to form mono-potassium dihydrogen phosphate. The solution should be vigorously agitated to assure complete reaction. After the mixture stands a short time, there may crystallize out a quantity of a potassium phosphate compound. This compound should be removed either by decantation, filtration or by centrifuging. The acidulated solution is now subjected to vacuum evaporation, whereupon there distils off some acetone and a large amount of water, part of which is from the original formaldehyde solution and the rest of which has been formed in the reaction. Simultaneously, there are evolved several volatile ketone-aldehyde condensation products, some of which are rather irritating to the nose and eyes. Toward the end of the distillation phase, the temperature should be permitted to run up to approximately 150° C. with a vacuum of from 20 to 22 inches.

There is now added an additional amount of phosphoric acid, approximately 1% to 2% on the weight of the original acetone.

The time required for Step two depends to a large extent upon the type and structure of the equipment. If the evaporation is carried out in small laboratory glassware with an oil bath and an efficient stirrer, the step requires about two hours. On the other hand, if the material of Step one is simply placed into pans which are set in a steam heated vacuum oven, fully sixteen hours are required. In large scale commercial production using a properly designed evaporating unit, the step should require four to eight hours.

The product of Step two is an amber colored liquid which is moderately viscous and which can be readily poured while hot.

Step three

The product of Step two is now subjected to further auto-reaction. This may be carried out in a small reaction kettle since the product has greatly decreased in bulk during Step two. The reaction kettle should be provided with a low speed stirrer and with facilities for heating to a maximum of approximately 150° C. The product is heated to about 150° C., 100 pounds steam pressure being very satisfactory. In this reaction there is evolved a further quantity of volatile material which contains water and various ketone-aldehyde condensation products, some of which have a very irritating effect on the nose and eyes.

The time required for the final step depends to a large extent upon the temperature, the rate of stirring and the amount of catalyst that was used in Step two. In practice this step can be completed in from two to six hours.

The product of the third step depending upon various factors varies from a very viscous liquid to a grindably hard resin.

The following is given as an additional illustrative procedure for preparing the standard or maximum yield product:

Step one

About one-third of an ounce of potassium carbonate is dissolved in approximately forty ounces of aqueous formaldehyde solution (38% solution), and the resulting solution is added to approximately forty ounces of acetone. When the vigor of the reaction has diminished somewhat, an additional thirty-three ounces of formaldehyde are added to the mixture, and when the reaction has again subsided, a final thirty-three ounces of formaldehyde are added. There is now introduced about 40 c. c. of a concentrated sodium hydroxide solution (412 grams of NaOH per liter of solution). The mixture may be allowed to stand overnight, or in lieu thereof it may be heated from four to eight hours at a temperature of from 60° to 100° C.

Step two

To the product of Step one, there is added approximately 40 c. c. of concentrated phosphoric acid (85%), and the mixture is subjected to vacuum distillation (18 to 26 inches). The final temperature should not exceed 150° C.

The yield of finished product in the above example is about 75 ounces.

The following is another illustrative procedure for preparing the standard or maximum yield product using methyl ethyl ketone instead of acetone:

Methyl ethyl ketone (50 parts) is placed in a kettle which is equipped with an agitator. Then formaldehyde solution (30 parts) containing potassium carbonate (2 parts) dissolved therein is added gradually. The temperature is allowed to rise to about 80° C., kept at about 80° C. for about an hour and then cooled down to about 50° C. Then an additional amount of formaldehyde solution (30 parts) is added and after this amount has reacted, a final amount of formaldehyde (30 parts) is added. The temperature is then preferably raised to about 80° C. and a concentrated caustic soda or potash solution (2 parts) is added. The reaction is complete in several hours.

The reaction mixture may or may not separate into two layers, depending upon the proportions of the reagents and catalyst and the extent to which the reaction has been permitted to proceed. The upper of the two layers contains primarily water with a small amount of unreacted material, chiefly ketone.

The reaction mixture is then neutralized, preferably with sulphuric, hydrochloric or phosphoric acid and then an additional amount of phosphoric acid (four parts) is added and the mixture is dehydrated under a vacuum. The end temperature should not be above 150° C. The end product varies from a very viscous liquid to a soft solid. However, if the dehydration temperature is too high there may result a brown reddish substantially infusible mass which is unsuitable for our purposes. The same result may occur if the amount of the acid catalyst is too high or if the acid catalyst is added before the first stage is substantially complete.

The following is given as an illustrative procedure for preparing the super-active product:

One ounce of potassium carbonate is added to thirty ounces of formaldehyde solution (38%). The resulting solution is mixed with ninety ounces of acetone in a reaction vessel provided with a stirrer, reflux condenser and suitable means to regulate temperature. After the reaction has subsided, an additional thirty ounces of formaldehyde are added. It ordinarily takes from eight to twenty four hours to complete this stage of the reaction.

When the reaction is completed, 40 c. c. of phosphoric acid (85%) is added, and the mixture is subjected to vacuum evaporation. If the final temperature is kept between 120° and 150° C., the product is a viscous dark colored liquid. If the temperature is permitted to go above 150° C. or more time is permitted for the reaction, the product will gradually become converted into a substantially solid, still somewhat fusible product, but if the temperature is kept above 150° C. for a sufficient time, the product will eventually change into an infusible and insoluble form.

It is to be noted that in each of the foregoing examples, the ratio of ketone to aldehyde is the primary factor which determines the character of the product. In preparing the super-active product, a high ketone-aldehyde ratio is employed, while in preparing the standard form a low ketone-aldehyde ratio is used. The preferable ketone-aldehyde ratio in the case of the super-active product is ninety parts of acetone to sixty parts of formaldehyde (38%). In the case of the standard form, the proportions are preferably 40 parts of acetone to 140 parts of formaldehyde. It is also to be noted that this latter ratio corresponds to a maximum yield of product on a cost basis, all other things being equal. As has already been stated, the yield is also dependent to an appreciable extent upon the amount of sodium hydroxide added. If the amount of sodium hydroxide is reduced below 40 c. c. for the foregoing proportions of acetone and formaldehyde, there is an appreciable decrease in yield. An increase in the amount of alkali above 40 c. c. does not appreciably increase the yield; in fact, when the amount exceeds 70 c. c. the yield decreases somewhat. If the amount of alkali is raised to 100 c. c. or over, the reaction mixture separates into two layers. The lower of the two layers contains a product which is not particularly suitable for further processing.

The amount of acid catalyst also has an appreciable effect on the yield. If the amount of acid is decreased to that which is necessary for neutralizing the alkali or below that amount, not only does the yield drop sharply but the product is decidedly inferior. In case phosphoric acid is employed as the catalyst, the ketone-aldehyde ratio being 40:140 as above indicated and the sodium hydroxide used in the first stage being 40 c. c., the maximum yield is obtained with 40 c. c. of acid. Increases in acid above 40 c. c. do not appear to increase the yield or to improve the quality of the product.

In producing the standard products, the reagents appear to combine in certain molecular ratios which in the case of acetone and formaldehyde permit the expression of the relationship in the following simple equation:

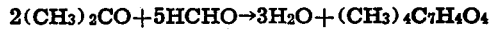

$$2(CH_3)_2CO + 5HCHO \rightarrow 3H_2O + (CH_3)_4C_7H_4O_4$$

The foregoing equation accurately expresses the ratio of ketone to aldehyde and to the yield of the standard or maximum yield product and water of reaction. For many purposes, it is convenient to consider the standard product as a specific chemical compound of definite chemical composition, and to ascribe to it upon an ash free basis the formula:

$$(CH_3)_4C_7H_4O_4$$

This corresponds to a molecular weight of 212, though, of course, it is very likely that the actual molecular weight is some multiple of 212 and that polymers of various molecular weights may be present.

At the present time, the indications are that the super-active product is really a highly complex mixture of related compounds and depending upon the precise ratio of initial components, catalysts, temperatures, etc. a variety of products with different melting points and physical characteristics may be produced, all of them, however, possessing in common the unusually high chemical reactivity which distinguish them from the standard products. It is to be noted that by controlling the various factors previously enumerated, it is also possible to produce varieties of Afr varying in chemical reactivity from the standard to the super-active products. These products of intermediate reactivity are probably mixtures of standard and super-active Afr. Those approaching the super-active product in activity may be considered as being included in the term "super-active Afr", while the others may be considered as being included in the term "standard Afr".

The products of the present invention generally contain considerable amounts of impurities, mostly inorganic materials. These impurities may be removed, if thought necessary or desirable, by dissolving the product in one of the many organic solvents in which Afr is ordinarily soluble and thereafter separating the insoluble inorganic material by filtration or centrifuging. When the solvent is distilled off, substantially pure Afr is left.

Incidentally, it may be stated that the impurities need not be removed when the product is used for many of its possible applications. The impurities do reduce the dielectric strength of the product, and should therefore be removed if the product is to be used for exacting electrical purposes. Furthermore, the impurities function as catalysts when the product is further reacted. This can be offset without purifying the product by adding acids or alkalies to change the pH, though it may be noted that this is generally difficult in a buffered system.

It is to be particularly noted that with the exceptions previously indicated, stratification does not occur in the process. This constitutes one of the many advantages of the present invention, stratification being characteristic of most prior art methods. Furthermore, the product, particularly if acetone is one of the reagents, is generally completely water-soluble, unless the reaction is carried beyond the stage where the product has the viscosity of molasses. In this connection, it may be stated that the products may be produced in both glycerine-soluble and glycerine-insoluble forms, and that the products are generally soluble in each of the following solvents: "Carbitol" (diethylene glycol monoethyl ether), acetone, ethyl alcohol, methyl alcohol, furfural, cresol, phenol, ortho-tertiary amyl-phenol, ethyl lactate, cyclohexanone, cyclohexanol, "Cellosolve" (ethylene glycol monoethyl ether), and diethylene glycol. The products are generally insoluble in benzene, petroleum hydrocarbons, ethylene dichloride, mono-chloro-benzene, butyl acetate, methyl acetate, triethyl citrate and "Arochlor".

Afr, because of its unique chemical and physical properties, is suitable for a large number of useful applications in the industries. As an indication of its wide field of usefulness, it may be stated that Afr may be made into molding compositions, varnishes, paints, adhesives, cements and impregnating agents. For these purposes, Afr may be admixed with various solvents, fillers, plasticizers, hardening agents, other modifying agents as well as specific reagents adapted to react with Afr to produce compositions of different physical and chemical properties which adapt them for various industrial uses.

For reaction with certain reagents and for certain purposes, the less reactive varieties of Afr are more particularly suitable than the more reactive varieties. As an indication of this fact, it may be stated that the super-active product reacts as much as several hundred times faster with certain reagents than does the standard type. Generally speaking, the standard type may be reacted with such basic hardening materials as caustic soda and potash, diethylenetriamine, ethylenediamine, aniline, toluidine, etc. These materials vary considerably in their hardening effect, and hence by selection of the hardening agent the degree and speed of the hardening operation may be controlled and regulated to suit a particular purpose. It is to be particularly noted that the use of slow hardening agents such as aniline and its homologues results in products which are possessed of great strength and toughness. It is also to be noted that various resinous materials, synthetic or natural, may be added to the Afr as modifying agents before the hardening step.

In addition to being capable of serving as the base for synthetic resins, the less reactive types of Afr can be made to react with various other reagents of a non-resinous nature to form new and distinctive resins suitable for various purposes. Afr can react under suitable conditions with the following classes of substances to form resins:

1. *Substances containing phenolic hydroxyl groups.*—As examples of such substances may be mentioned the monohydric phenols such as carbolic acid and its homologues, the cresols, the xylenols, and the naphthols such as b-naphthol, a dihydric phenol such as catechol and resorcinol, a trihydric phenol such as pyrogallol and phloroglucinol, or a substituted phenol such as a chlorphenol, a nitro-phenol, or an amino-phenol. As additional examples may be mentioned salicylic acid and compounds of the type of di-phenyl such as para-oxydiphenyl.

2. *Substances containing amine or aminogroups.*—The substances may be aliphatic, aromatic, hydroaromatic or heterocyclic and include those substances which have been listed as suitable hardening agents for Afr. As additional examples may be listed the butylamines, benzylamine, methylaniline, oxamide, the amines of mono-, di-, and triphenylmethanes, the amino acids and the proteins as well as the amines of other ring compounds such as the furfurylamines.

3. *Cashew nut shell liquid (Cnsl) and its derivatives.*—As examples may be mentioned cashew nut shell liquid itself, anacardic acid which is the chief ingredient of cashew nut shell liquid, the crude or purified esterification products prepared in accordance with our copending application Serial No. 149,098 filed June 17, 1937 and the amine derivatives prepared according to the disclosure of our copending application Serial No. 157,394 filed August 4, 1937.

It is to be particularly noted that the reaction of Cnsl and its derivatives with Afr materially reduces the so-called poison-ivy effect of Cnsl and its derivatives. This is of considerable importance as the so-called poison ivy effect of Cnsl and its derivatives constitutes a very serious industrial hazard.

4. *Materials of terpenic nature.*—As examples may be mentioned turpentine oil, camphor oil, a-terpineol oil, resin oil, etc.

The following examples are given to illustrate the reaction of standard Afr with normally non-resinous materials to form resins:

*Example I*

Afr (8 parts) is mixed with phenol (10 parts) and a catalyst or condensing agent, and the mixture is refluxed for approximately one hour at a temperature somewhat above the boiling point of water. Then the temperature is raised until it reaches about 310° F. to distil off the volatile material. Refluxing is then continued until a sample removed from the reaction mixture and cooled yields a grindably hard resinous material.

The catalyst or condensing agent may be any one or mixtures of any one or more of the acid or acid producing catalysts which have been mentioned as being suitable for use in the second stage of the preparation of the Afr.

The catalyst may be omitted, in which case higher temperatures have to be used and the mixture has to be refluxed for a longer period of time than has been indicated.

Example II

Afr (8 parts), cresol (12 parts) and a catalyst such as sulphuric acid are mixed and subjected to substantially the same treatment as in Example I. The catalyst may be present in the ratio of about 1% on the weight of the cresol and should preferably be dissolved in a little phenol.

Example III

Cashew nut shell liquid is mixed with Afr in the ratio of 10 parts of the Cnsl to 4 parts of the Afr, and the mixture is heated to about 300° F. The temperature is maintained at this point until a sample removed from the reaction mixture and cooled yields a highly viscous liquid which hardens slowly without the addition of hardening agents.

Example IV

Ten parts of aniline are refluxed with 6 parts of Afr, the temperature toward the end of the reaction being permitted to reach 400° F. The mixture is kept at this temperature and agitated until a sample withdrawn and cooled yields a highly viscous material which hardens slowly. A variation of the process consists in continuing the heating until there results a product which when cold is hard and brittle.

The resins made by reaction between Afr and non-resinous materials in common with those previously described can be made in a wide range of physical and chemical properties and can be used for the preparation of molding compositions, paints, varnishes, adhesives, cements, etc. They can also be mixed with various fillers, solvents, plasticizers, hardening agents and other modifying agents, depending upon the particular purpose for which they are intended. The conventional hardening agents may be used to harden any of the resinous products prepared from Afr and other resinous or non-resinous materials. We have found super-active Afr itself to be an excellent hardening agent for this purpose.

It may also be noted at this point that the standard type of Afr as well as certain reaction products of Afr with phenols are particularly well suited for the preparation of single stage resins. Very satisfactory results are obtained when twelve moles of phenol are caused to react with sixteen moles of formaldehyde and one mole of standard Afr. A higher phenol to the extent of one-half mole may be added to the reaction mixture.

Both the standard and the more reactive types of Afr may be used in admixture with the chlorination products of Cnsl and of its derivatives to augment the rubbery characteristics of the chlorination products. The chlorination products, briefly stated, may be made by passing chlorine gas into Cnsl, anacardic acid, or their derivatives such as the amine derivatives or esterification products.

It is to be particularly noted that the more reactive types of Afr are more suitable for this purpose than are the less reactive types. A superactive form of Afr which is particularly suitable for augmenting the rubbery characteristics of chlorinated Cnsl may be made as follows:

Potassium carbonate (0.00725 mole) is dissolved in an aqueous 38% formaldehyde solution containing one mole of formaldehyde. This solution is mixed with acetone (3.46 moles). When the reaction has subsided (the reaction takes from four to six hours), a saturated sodium hydroxide solution (0.00364 mole) of NaOH is added. The mixture is permitted to stand about twenty hours and then an 85% phosphoric acid solution (0.00785 mole) is added. The mixture is placed in a steam heated vacuum oven and a vacuum of between 18 and 26 inches is applied while a steam pressure of between 100 and 120 pounds is maintained on the heating unit. The final processing is completed in from ten to twelve hours. The surplus acetone which distils over with the water may be recovered in any suitable manner.

The following is given as a typical procedure for producing a rubbery product by incorporating a super-active Afr with a chlorination product of Cnsl:

Cnsl is first heated to a temperature of about 500° F. in the presence of a very small amount of aniline (about 1%). The product is then cooled to room temperature and is chlorinated, preferably in the presence of a small quantity of a chlorinated solvent such as ethylene dichloride. The chlorination may be accomplished by passing chlorine gas through the solution at a temperature of about 250° F. until between 17 and 22% of chlorine has been absorbed. To the resultant product there is then added between 5 and 15% of super-active Afr, and the mixture is cured in an oven at a temperature of from 250° to 300° F. for a period of from one to three hours.

The resultant product has many of the desirable characteristics of natural rubber and is wholly compatible with rubber. As much as 5% of rubber (solvent rubber or latex) may be incorporated with the product to improve its physical characteristics. Various other materials such as carbon black (2 to 3%) and organic accelerators, etc., may also be incorporated.

The more reactive types of Afr are also suitable for use as hardening agents for a wide range of resinous materials, both natural and synthetic. Generally speaking, Afr can be used to harden any resin containing a reactive phenolic hydroxyl group. Among the natural resinous substances which may be hardened by Afr may be mentioned gum accroides and dragon's blood. Among the synthetic resinous substances which may be hardened by Afr may be mentioned the condensation products of phenols with aldehydes, carbohydrates, ketones and polyhydric alcohols. The aldehyde may be acetaldehyde, benzaldehyde, formaldehyde, furfural or their derivatives. The ketone may be acetone or methyl ethyl ketone, and the polyhydric alcohol may be glycerol or glycol. As examples of synthetic resins which may be hardened by Afr may be mentioned the permanently fusible resinous phenol condensation products of the Novolak, shellac substitute and Saliretin type. As a specific example may be mentioned the product of the Durite Plastics Division of Stokes and Smith Company, Philadelphia, Pennsylvania, known as "Durite No. 291". This material is a phenol-formaldehyde reaction product prepared with insufficient formaldehyde to completely resinify the phenol. As another specific example may be mentioned any of the phenol-furfural resins made by the same company, those prepared with a low furfural to phenol ratio (1:2) being preferred.

Closely related to the synthetic resins of the foregoing types is a class of normally non-resinous substances which are readily convertible to resins. As examples of those substances may be mentioned the class of phenol alcohols such as saligenin, as well as di- and tri-phenyl methanes containing one or more reactive phenolic hydroxyl groups, e. g., para-dihydroxy-diphenyl methane, or trihydroxy-triphenyl methane or its carbinol. Afr can be used to resinify and to harden the foregoing class of substances. Afr can also be used to harden resins which do not contain phenolic hydroxyl groups such as pitch and rosin as well as abietic acid which is the chief constituent of rosin.

Afr can also be used to harden resins containing amine or amino-groups. As examples of such resins may be mentioned the urea and thiourea resins.

Afr can also be used to harden the various condensation products and synthetic resins prepared from cashew nut shell liquid or anacardic acid or from their derivatives such as the amine derivatives and esterification products of cashew nut shell liquid and anacardic acid. Reference is hereby made to the following applications disclosing resinous products prepared from the foregoing reagents, which may be readily hardened by Afr:

Application Serial No. 141,182 filed May 6, 1937; application Serial No. 141,183 filed May 6, 1937; application Serial No. 157,394 filed August 4, 1937; application Serial No. 158,701 filed August 12 1937; application Serial No. 163,747 filed September 14, 1937.

The incorporation of Afr as a hardening agent in a resinous composition renders the composition particularly suitable for cold molding, casting and extrusion molding. The composition is especially suitable for the manufacture of abrasive wheels. Excellent hardening effects can be produced by incorporating 25 to 40% of Afr on the total weight of the mixture.

The following are some of the advantages of Afr as a hardening agent over conventional hardening agents such as hexamethylenetetramine:

1. Afr is much less expensive.
2. Afr is procurable in modifications which have very low fusing points. Hence, they serve also as fluxing agents and end up in the product as an integrable infusible part of the resin.
3. Compositions containing Afr can be heated to form liquid compositions which may be poured and cured after the manner of casting resins.
4. Compositions containing Afr do not evolve gases when heated. Hence, it is possible to prepare hardened products without bubble formation and without the creation of internal stresses.
5. Afr causes the composition to cure very slowly, thus obviating the danger of overcuring. The hardening effect can be increased to any desired degree approaching that of hexamethylenetetramine by the addition of alkaline materials.
6. Compositions hardened with Afr are tougher and stronger than those hardened in the manner of the prior art.

As has been stated, Afr either of the standard or super-active types may be reacted with various reagents by mixing the Afr with the particular reagents under suitable reaction conditions. A variation consists in adding the reagent not to the finished Afr but to the reaction mixture of ketone and formaldehyde either at the very beginning of the reaction or at some stage before the completion of Afr. Thus, we may add to the initial mixture of acetone and formaldehyde, a phenol such as carbolic acid and continue the reaction as if no phenol had been added. The resulting product differs from Afr as prepared without phenol in certain of its properties. For instance, the color is lighter, the viscosity is lower, and the solubility and chemical reactivity are somewhat diminished. It should be noted that the end product is not the same as when Afr as ordinarily prepared is later reacted with phenol. What has been said with reference to phenol applies to a large extent to other reagents such as amines such as aniline. However, in the case of aniline and other aromatic amines there is a pronounced tendency for the formation of two layers in the reaction mixture.

Still further modifications may be obtained by incorporating ammonia, either gaseous or aqueous, into the reaction mixture, particularly after the alkali catalyst has had sufficient time to produce its effect. Thus, it has been found advantageous to add ammonia in the form of a concentrated solution two to eight hours after the basic condensing agent has been added, and then to allow the mixture to stand overnight. The resulting product is quite similar in its properties to the standard type of Afr (when the other conditions are such as to promote the formation of the standard type), but it differs in several important respects. Its color is several shades lighter and its chemical reactivity is somewhat different. For instance, it manifests a greater reactivity to certain reagents and a less reactivity to certain other reagents, as compared with the standard variety.

From the foregoing description, it can be seen that by departing from conventional methods of preparing synthetic resins and resorting to new procedures, we have succeeded in obtaining a new and distinctive class of resinous complexes and compositions having a wide range of useful applications in the industries.

We claim:

1. The method of making a fusible ketone-aldehyde reaction product, which comprises reacting an aldehyde containing from one to six carbon atoms with a ketone of the straight ketone type in the proportions of at least 0.2 mole of aldehyde to each mole of ketone in the presence of an alkaline catalyst until substantially all the aldehyde is consumed, and then adding an acidic catalyst to effect further reaction while maintaining acid conditions.

2. The method of making a fusible ketone-aldehyde reaction product, which comprises reacting an aldehyde containing from one to six carbon atoms with a ketone of the type of $R_1$—CO—$R_2$, in which $R_1$ is a simple methyl group and $R_2$ is an aliphatic radical containing from one to six carbon atoms, in the proportions of at least 0.2 mole of aldehyde to each mole of ketone in the presence of an alkaline catalyst until substantially all the aldehyde is consumed, and then adding an acidic catalyst to effect further reaction while maintaining acid conditions.

3. The method of making a fusible ketone-aldehyde reaction product, which comprises reacting acetone with an aldehyde containing from one to six carbon atoms in the proportions of at least 0.2 mole of aldehyde to each mole of acetone in the presence of an alkaline catalyst until substantially all the aldehyde is consumed, and then adding an acidic catalyst to effect further reaction while maintaining acid conditions.

4. The method of making a fusible ketone-aldehyde reaction product, which comprises reacting formaldehyde and acetone in the proportions of at least 0.2 mole of formaldehyde to each mole of acetone in the presence of an alkaline catalyst until substantially all the formaldehyde is consumed, and then adding an acidic catalyst to effect further reaction while maintaining acid conditions.

5. The method of making a fusible ketone-aldehyde reaction product, which comprises reacting formaldehyde and acetone, the ratio of acetone to formaldehyde being in excess of molecular proportions, in the presence of an alkaline catalyst until substantially all the formaldehyde is consumed, and then adding an acidic catalyst to effect further reaction while maintaining acid conditions.

6. The method of making a fusible ketone-aldehyde reaction product, which comprises reacting formaldehyde and acetone, the ratio of acetone to formaldehyde being less than molecular proportions, in the presence of an alkaline catalyst until substantially all the formaldehyde is consumed, and then adding an acidic catalyst to effect further reaction while maintaining acid conditions.

7. The method of making a fusible ketone-aldehyde reaction product, which comprises reacting formaldehyde and acetone in the proportions of about 0.4 mole of formaldehyde to each mole of acetone in the presence of an alkaline catalyst until substantially all the formaldehyde is consumed, and then adding an acidic catalyst to effect further reaction while maintaining acid conditions.

8. The method of making a fusible ketone-aldehyde reaction product, which comprises reacting formaldehyde and acetone in the proportions of about 2.6 moles of formaldehyde to each mole of acetone in the presence of an alkaline catalyst until substantially all the formaldehyde is consumed, and then adding an acidic catalyst to effect further reaction while maintaining acid conditions.

9. A composition of matter containing a ketone-aldehyde reaction product prepared by reacting an aldehyde containing from one to six carbon atoms with a ketone of the straight ketone type in the proportions of at least 0.2 mole of aldehyde to each mole of ketone in the presence of an alkaline catalyst until substantially all the aldehyde is consumed, and then adding an acidic catalyst to effect further reaction while maintaining acid conditions.

10. A composition of matter containing a ketone-aldehyde reaction product prepared by reacting acetone with an aldehyde containing from one to six carbon atoms in the proportions of at least 0.2 mole of aldehyde to each mole of acetone in the presence of an alkaline catalyst until substantially all the aldehyde is consumed, and then adding an acidic catalyst to effect further reaction while maintaining acid conditions.

11. A composition of matter containing a ketone-aldehyde reaction product prepared by reacting formaldehyde and acetone in the proportions of at least 0.2 mole of formaldehyde to each mole of acetone in the presence of an alkaline catalyst until substantially all the formaldehyde is consumed, and then adding an acidic catalyst to effect further reaction while maintaining acid conditions.

12. A composition of matter containing a ketone-aldehyde reaction product prepared by reacting formaldehyde and acetone in the proportions of about 2.6 moles of formaldehyde to each mole of acetone in the presence of an alkaline catalyst until substantially all the formaldehyde is consumed, and then adding an acidic catalyst to effect further reaction while maintaining acid conditions.

13. As a composition of matter, a homogeneous potentially reactive mixture containing a fusible phenolic resin and a hardening agent for said resin, said hardening agent consisting of a ketone-aldehyde reaction product prepared by reacting an aldehyde containing from one to six carbon atoms with a ketone of the straight ketone type in the proportions of at least 0.2 mole of aldehyde to each mole of ketone in the presence of an alkaline catalyst until substantially all the aldehyde is consumed, and then adding an acidic catalyst to effect further reaction while maintaining acid conditions.

14. As a composition of matter, a homogeneous potentially reactive mixture containing a fusible phenolic resin and a hardening agent for said resin, said hardening agent consisting of a ketone-aldehyde reaction product prepared by reacting formaldehyde and acetone in the proportions of at least 0.2 mole of formaldehyde to each mole of acetone in the presence of an alkaline catalyst until substantially all the formaldehyde is consumed, and then adding an acidic catalyst to effect further reaction while maintaining acid conditions.

15. As a composition of matter, a homogeneous potentially reactive mixture containing a fusible phenolic resin and a hardening agent for said resin, said hardening agent consisting of a ketone-aldehyde reaction product prepared by reacting formaldehyde and acetone, the ratio of acetone to formaldehyde being in excess of molecular proportions, in the presence of an alkaline catalyst until substantially all the formaldehyde is consumed, and then adding an acidic catalyst to effect further reaction while maintaining acid conditions.

EMIL E. NOVOTNY.
GEORGE KARL VOGELSANG.